Oct. 27, 1925.  1,558,505
E. J. RAY
METHOD OF PRODUCING RUBBER ARTICLES
Filed Dec. 31, 1924

INVENTOR-
Eugene J. Ray
By his Attorney,
Nelson M. Howard

Patented Oct. 27, 1925.

1,558,505

UNITED STATES PATENT OFFICE.

EUGENE J. RAY, OF BEVERLY, MASSACHUSETTS, ASSIGNOR TO UNITED SHOE MACHINERY CORPORATION, OF PATERSON, NEW JERSEY, A CORPORATION OF NEW JERSEY.

METHOD OF PRODUCING RUBBER ARTICLES.

Application filed December 31, 1924. Serial No. 759,174.

*To all whom it may concern:*

Be it known that I, EUGENE J. RAY, a citizen of the United States, residing at Beverly, in the county of Essex and Commonwealth of Massachusetts, have invented certain Improvements in Methods of Producing Rubber Articles, of which the following description, in connection with the accompanying drawings, is a specification, like reference characters on the drawings indicating like parts in the several figures.

This invention relates to methods of producing rubber articles and is particularly applicable to the production of rubber articles having different portions of unlike character as, for example, of different degrees of hardness, different qualities, different colors, or the like.

In a rubber article such, for example, as a rubber heel consisting of portions or sections of unlike character there is a visible line of demarcation at the joint or surface of union between the different portions of the article. Heretofore, when such articles were produced by vulcanizing together at a single operation masses or biscuits of different rubber compositions this line was wavy or irregular because both of the biscuits of plastic rubber composition would flow more or less during the molding and vulcanizing operation. It has, therefore, been considered impracticable to produce, by a single vulcanization, a unitary article such, for example, as a rubber heel having two layers of unlike character with a plane joint between the layers.

It is desirable that the visible joint in articles of the character above referred to appear as a straight or even line, and it is the object of the present invention to provide a method of molding such rubber articles in such a manner that they will have this desirable characteristic.

I have discovered that if a biscuit of suitably prepared rubber composition is cold molded under considerable pressure to exactly the final size and shape which it is to have in the completed article and is then confined at all its faces except one, another biscuit of rubber composition may be placed upon its unconfined face and by a proper application of heat and pressure in a mold be so molded in shape as to complete the desired article and, together with the previously cold molded section, be vulcanized at a single operation into a unitary article without material flowage of the first section and, consequently, without producing a wavy or irregular surface of union between the two. By "cold molding" in the present specification and claims it is not intended to designate any particular temperature but only to indicate molding at a temperature insufficient to cause vulcanization of the rubber composition, and in practice such cold molding may conveniently be accomplished at ordinary room temperatures.

Broadly considered, the invention consists in a method of uniting masses of rubber compositions of unlike character, to produce a unitary article with a predetermined surface of union between the masses, by cold molding and condensing one mass to shape and confining all its faces except the surface of union while molding and vulcanizing another mass to it. In the preferred mode of practising the invention the first mass is cold molded to the exact size and shape of a portion of a vulcanizing mold adapted to produce the entire article, fitted into the vulcanizing mold, a mass of unvulcanized rubber composition of another character sufficient to fill the remaining space in the mold is inserted, and sufficient heat and pressure are applied to cause the second mass to take the shape of the mold and both masses to be vulcanized into a unitary article.

One useful application of the method is in the manufacture of rubber heels of composite structure having a soft rubber top and a relatively hard base, and this example of the invention has been selected for illustration and specific description in the following specification. It should be understood, however, that the invention is not limited to the manufacture of heels but is applicable to the manufacture of a wide variety of other molded articles where the same problem is presented. Furthermore, it may be stated at this point that the term "rubber" is used throughout this specification and the following claims in a broad and inclusive sense to designate any rubber or similar composition capable of being molded to a desired shape and vulcanized by the application of pressure and heat.

Figure 1:
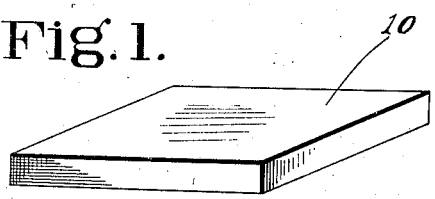
Fig. 1 is a perspective view of a piece of unvulcanized rubber composition which has been rolled out into sheet form.
Figure 2:
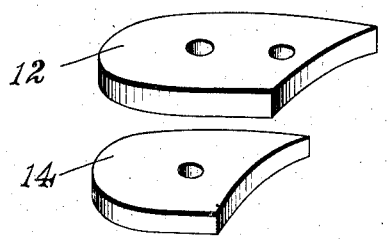
Fig. 2 shows a pair of heel shaped pieces died out of the unvulcanized sheet stock.

Referring now to the drawings, 10 indicates a sheet of unvulcanized rubber compound which may be of a composition suitable for the production of the base portion or section of a composite heel. As illustrated, lifts, 12, 14 are died out of such a sheet of rubber composition and placed in a compressing mold 16 where they are subjected to heavy pressure.

The cavity in the mold 16 is of the size and shape desired for the base portion of the completed heel and is identical with the base portion of the cavity in the vulcanizing mold 18 in which the heel is to be vulcanized. The application of pressure to the mass of rubber composition in the mold 16 causes the two layers or lifts 12, 14 to be combined into a single mass of material and molded exactly to the size and shape of the cavity or space in the mold. The rubber composition, which is naturally more or less porous, is also somewhat compressed or condensed and is made firmer, with the result that it will be less easily deformed in the subsequent operation. The molding and condensing of the heel base section is carried out at a temperature below that necessary to vulcanize the rubber, and this step may, therefore, aptly be termed cold molding. Ordinarily, it may conveniently be performed at the usual room temperature.

Figure 3:
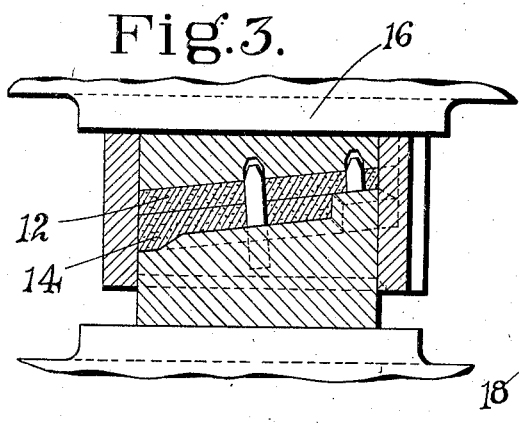
Fig. 3 shows the two pieces of material illustrated in Fig. 2 assembled in a compressing mold which is closed in the process of applying molding and condensing pressure.
Figure 4:
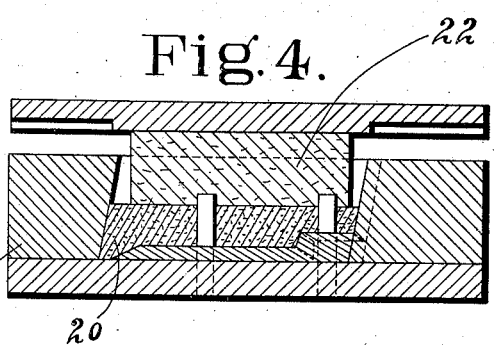
Fig. 4 shows a vulcanizing mold with the blank produced by the step illustrated in Fig. 3 fitted therein, together with an additional biscuit ready for molding and vulcanizing.
Figure 5:
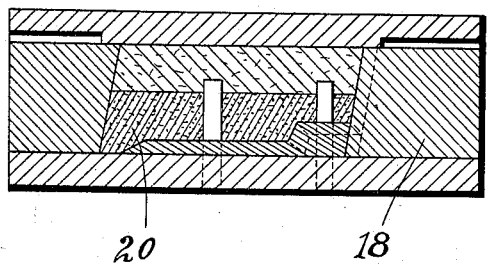
Fig. 5 shows the same elements as Fig. 4 just prior to the opening of the mold after vulcanization has occurred.

The cold molded heel base section which, in Figs. 4 and 5, is designated by the numeral 20 is removed from the mold 16 and placed in the base portion of the cavity in the vulcanizing mold 18 which it fits exactly, leaving no space between the lateral surface of the blank 20 and the walls of the mold. In the molding operation illustrated in Fig. 3 a plane top surface is formed upon the blank, and after the blank has been fitted into the vulcanizing mold this surface is the only face of the blank which is not confined.

Figure 6:
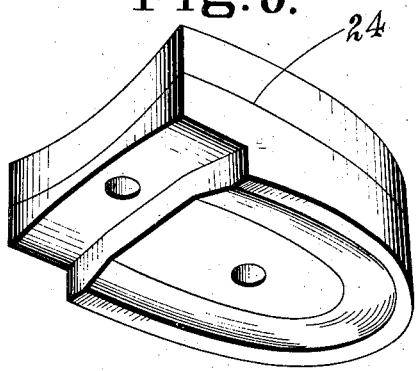
Fig. 6 is a perspective view of the finished product.

A biscuit 22 of a rubber composition different from that of the blank 20, suitable for the production of the soft rubber top portion or section of the heel and containing a sufficient amount of material to fill the remainder of the vulcanizing mold cavity is next placed in the mold upon the base section 20. Heat and pressure are applied, the biscuit 22 being first caused to conform to the space in the mold and to fill the same and then, together with the base section 20, being vulcanized into an inseparable, unitary heel. In this last molding and vulcanizing step the preliminarily cold molded and condensed base section 20 does not flow appreciably, and the surface of union between the two unlike portions of the heel remains substantially flat. The visible joint at the edge of the heel, which is indicated by the line 24 in Fig. 6 is consequently uniform and free from irregularity.

By the novel method of my invention rubber heels or other articles having different portions of unlike character may be readily produced with great uniformity and perfection with a single vulcanizing operation.

Having described the invention, what is claimed as new and desired to be secured by Letters Patent is:

1. The method of uniting masses of vulcanizable rubber compositions of unlike character to produce a unitary article with a predetermined surface of union between the masses which consists in cold molding and condensing one mass to shape, and confining all its faces except the surface of union while molding and vulcanizing another mass to it.

2. The method of molding a rubber article having different portions of unlike character which consists in cold molding and condensing a mass of unvulcanized rubber composition of one character, under pressure, to the exact size and shape of a portion of a vulcanizing mold adapted to produce the entire article, fitting the molded mass into said portion of the mold, placing in the mold a sufficient mass of unvulcanized rubber composition of another character to fill the remaining space in the mold, and applying heat and pressure sufficient to cause the second mass to take the shape of the mold and both masses to be vulcanized into a unitary article.

3. The method of making from vulcanizable compositions a composite heel having a soft rubber top and a relatively hard base which consists in cold molding the base portion to final size and shape, applying it to a biscuit of material for the top portion, and simultaneously molding the top portion to shape and vulcanizing both portions into a unitary heel.

4. The method of making in a vulcanizing mold from vulcanizable compositions a composite heel having a soft rubber top and a relatively hard base which consists in cold molding the base, to fit exactly the base portion of the vulcanizing mold cavity, placing the molded base in said cavity, placing upon the base in said cavity an unmolded biscuit containing sufficient material for the soft top portion of the heel, and applying heat and pressure to mold the biscuit and to vulcanize the entire mass into a unitary heel.

5. The method of making a unitary rubber heel having two layers of unlike character with a plane joint between the layers which consists in cold molding and condensing one layer under heavy pressure to final size and shape and then, with the aid of heat and pressure, molding the second layer to the first and vulcanizing the entire mass into a unitary heel.

In testimony whereof I have signed my name to this specification.

EUGENE J. RAY.